United States Patent
Yamashita et al.

(10) Patent No.: US 11,133,673 B2
(45) Date of Patent: Sep. 28, 2021

(54) DIRECT CURRENT BUS CONTROL SYSTEM

(71) Applicant: RIKEN, Wako (JP)

(72) Inventors: Daiji Yamashita, Saitama (JP); Masakazu Sugiyama, Saitama (JP); Katsuhiko Tsuno, Saitama (JP); Kayo Koike, Saitama (JP); Katsushi Fujii, Saitama (JP); Satoshi Wada, Saitama (JP)

(73) Assignee: RIKEN, Wako (JP)

( * ) Notice: Subject to any disclaimer, the term of this patent is extended or adjusted under 35 U.S.C. 154(b) by 0 days.

(21) Appl. No.: 16/878,725

(22) Filed: May 20, 2020

(65) Prior Publication Data

US 2020/0280183 A1 Sep. 3, 2020

Related U.S. Application Data

(63) Continuation of application No. PCT/JP2018/043064, filed on Nov. 21, 2018.

(30) Foreign Application Priority Data

Nov. 21, 2017 (JP) .............................. JP2017-223808

(51) Int. Cl.
*H02J 1/10* (2006.01)
*H02J 1/02* (2006.01)
(Continued)

(52) U.S. Cl.
CPC ............... *H02J 1/102* (2013.01); *H02J 1/02* (2013.01); *H02J 1/04* (2013.01); *H02J 15/008* (2020.01);
(Continued)

(58) Field of Classification Search
CPC .. H02J 15/008; H02J 2300/20; H02J 2300/30; H02J 1/02; H02J 1/04; H02J 1/10
(Continued)

(56) References Cited

U.S. PATENT DOCUMENTS 9,735,619 B2   8/2017 Inoue
2014/0084872 A1  3/2014 Iida et al.
(Continued)

FOREIGN PATENT DOCUMENTS

JP   2005-224009 A   8/2005
JP   2006-129585 A   5/2006
(Continued)

OTHER PUBLICATIONS

International Search Report for PCT/JP2018/043064 dated Dec. 25, 2018 (PCT/ISA/210).
(Continued)

*Primary Examiner* — Hal Kaplan
(74) *Attorney, Agent, or Firm* — Sughrue Mion, PLLC

(57) ABSTRACT

A direct current bus control system including a direct current bus connecting between an input power supply and a load, including a main stabilizing device including a first charge-&-discharge element and a first power converter, and at least one sub-stabilizing device including a second charge-&-discharge element, a charge element, or a discharge element, and including a second power converter, wherein the first power converter is configured to derive a bus voltage target value according to a power storage amount index of the first charge-&-discharge element, and to bidirectionally pass direct current power, so that the voltage of the direct current bus matches the bus voltage target value, and the second power converter is configured to derive a current target value, and to pass direct current power, so that a current equal to the current target value flows.

12 Claims, 18 Drawing Sheets

(51) Int. Cl.
    *H02J 1/04*         (2006.01)
    *H02J 15/00*        (2006.01)
(52) U.S. Cl.
    CPC ....... *H02J 2300/20* (2020.01); *H02J 2300/30* (2020.01)
(58) Field of Classification Search
    USPC .................................................. 307/44–46
    See application file for complete search history.

(56)             References Cited

U.S. PATENT DOCUMENTS

2014/0285010 A1*  9/2014  Cameron ................. H02J 1/14
                                                         307/29
2018/0362181 A1   12/2018  Iwashima et al.

FOREIGN PATENT DOCUMENTS

| JP | 2012-095418 A  | 5/2012  |
| JP | 2015-130732 A  | 7/2015  |
| JP | 5800919 B2     | 10/2015 |
| JP | 2017-005944 A  | 1/2017  |
| JP | 2017-175888 A  | 9/2017  |
| WO | 2011/109514 A1 | 9/2011  |
| WO | 2013/118336 A1 | 8/2013  |
| WO | 2013/145618 A1 | 10/2013 |
| WO | 2013/145658 A1 | 10/2013 |

OTHER PUBLICATIONS

Katsushi Fulii et al., "Regional Optimization Guideline for Small-sized Energy System with Hydrogen Storage based on Natural Energy Source", Journal of the Japan Institute of Energy, vol. 100, No. 6, Jun. 30, 2021, p. 45-54 (24 pages total).

Takayo Ogawa et al., "To reduce the cost of a plant factory using sunlight, Cost reduction of plant factory using solar energy", Journal of JSES, vol. 45. No. 4, Jul. 31, 2019, p. 10-15 (12 pages total).

Katsushi Fujii et al., "High-efficiency hydrogen storage from solar cells and small scale energy management using hydrogen storage", Enerumikusu, vol. 98, No. 3, May 20, 2019, an organ of the Japan Society of Energy, p. 240-247 (17 pages total).

Katsushi Fujii et al., "User-on-demand renewable energy supply system, User-on-Demand Energy Supply System with Renewable Energy", Clean energy Feb. 1, 2019, p. 25-33 (24 pages total).

Katsushi Fujii et al., "Method of controlling an energy supply system using renewable energy", Clean Technology, Dec. 1, 2020, p. 41-46 (15 pages total).

Kayo Koike et al., "Autonomous renewable energy system that realizes user-on demand", Chemical engineering, Dec. 1, 2019, p. 19-24 (14 pages total).

Daiji Yamashita et al., "Distributed control of a user-on-demand renewable-energy power-source system using battery and hydrogen hybrid energy-storage devices", International Journal of Hydrogen Energy, vol. 44, Sep. 21, 2019, p. 27542-27552 (11 pages total).

Katsushi Fujii et al., "User-on-demand renewable energy supply system", Chemical industry, Oct. 1, 2020, p. 606-612 (18 pages total).

Katsushi Fujii et al., "Control and design of energy supply systems using renewable energy", Chemical industry, Aug. 1, 2021, p. 1-8 (20 pages total).

Decision to Grant a Patent dated Jul. 13, 2021 issued with respect to the basic Japanese Patent Application No. 2019-555345.

Office Action dated Jul. 2, 2021 issued with respect to the corresponding Australian Patent Application No. 2018373453.

* cited by examiner

SUB-STABILIZING DEVICE 50

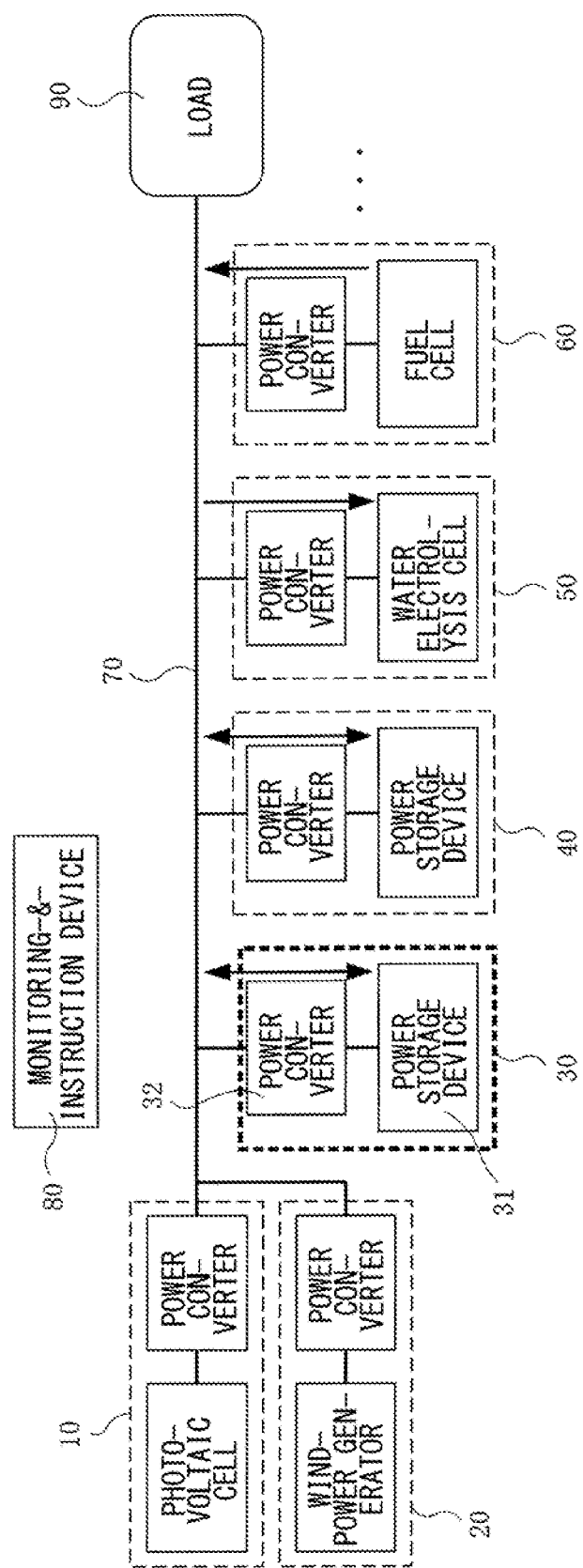

DIRECT CURRENT BUS CONTROL SYSTEM

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2018/043064 filed on Nov. 21, 2018 and designating the U.S., which claims priority to Japanese Patent Application No. 2017-223808 filed on Nov. 21, 2017. The entire contents of the foregoing applications are incorporated herein by reference.

BACKGROUND OF THE INVENTION

1. Field of the Invention

The present disclosure relates to a direct current bus control system.

2. Description of the Related Art

In recent years, as an alternative power source for fossil energy and nuclear energy, a power source system using renewable energy such as sunlight, wind, and wave power has been attracting attention, and some of these have already been put into practical use.

In this type of power supply system, the generated power greatly varies depending on the weather, season, location, and the like. For this reason, in order to maintain the voltage of the direct current bus connected with the power supply system within a predetermined permissible range, it is preferable that the power supply such as a photovoltaic cell or a wind power generator is directly connected to the direct current bus via a large-capacity power converter having a wide input range. However, in this case, an increase in the capacity of the power converter leads to an increase in the size, complexity, and cost of the entire system.

Here, for example, techniques described in PTL 1 to 3 are known as conventional techniques for stabilizing the power supplied from the power supply system to the direct current bus and the direct current bus voltage. However, since the power fluctuation of the renewable energy power system is large, it is difficult to efficiently control the power fluctuation of the direct current bus caused by an output fluctuation of the renewable energy power system and a load fluctuation.

CITATION LIST

Patent Literature

PTL 1: Japanese Laid-open Patent Publication No. 2017-5944 (paragraphs [0101] to [0107], FIG. 1)
PTL 2: Japanese Laid-open Patent Publication No. 2005-224009 (paragraphs [0009] to [0022], FIG. 1, FIG. 3)
PTL 3: U.S. Pat. No. 5,800,919 (paragraphs [0050] to [0052], FIG. 12)

SUMMARY OF THE INVENTION

Technical Problem

In view of the above, it is desirable to provide a control system for efficiently controlling a power fluctuation of a direct current bus caused by fluctuations of an input power supply and a load.

Means for Solving the Problems

A direct current bus control system for controlling a power fluctuation of a direct current bus connecting between an input power supply and a load includes a main stabilizing device including a first charge-&-discharge element and a first power converter and at least one sub-stabilizing device including a second charge-&-discharge element, a charge element, or a discharge element, and including a second power converter, wherein the first power converter is configured to derive a bus voltage target value according to a power storage amount index of the first charge-&-discharge element, and to bidirectionally pass direct current power between the first charge-&-discharge element and the direct current bus, so that the voltage of the direct current bus matches the bus voltage target value, and the second power converter is configured to derive a current target value according to a difference between: a threshold value of charge or discharge of the second charge-&-discharge element, the charge element, or the discharge element; and the voltage of the direct current bus, and is configured to pass direct current power between: the second charge-&-discharge element, the charge element, or the discharge element; and the direct current bus, so that a current equal to the current target value flows to or from the second charge-&-discharge element, the charge element, or the discharge element.

Advantageous Effects of Invention

According to at least one embodiment, it is possible to provide a control system for efficiently controlling a power fluctuation of a direct current bus caused by fluctuations of an input power supply and a load.

BRIEF DESCRIPTION OF THE DRAWINGS

FIG. 8A is a drawing for explaining an operation of the main stabilizing device;

DETAILED DESCRIPTION OF THE PREFERRED EMBODIMENTS

Hereinafter, an embodiment of the present invention will be described with reference to the drawings.

Figure 1:
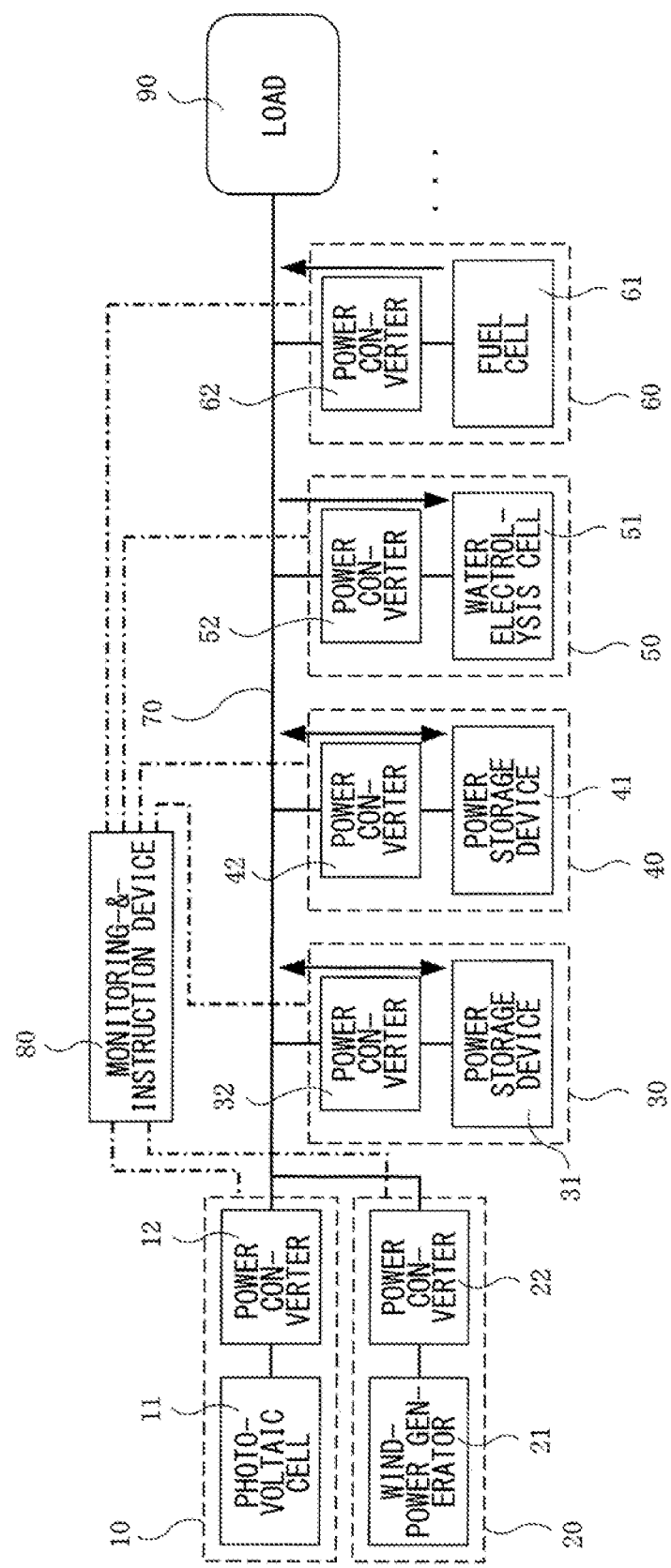
FIG. 1 is an overall configuration diagram illustrating a direct current bus control system according to an embodiment.

FIG. 1 is an overall configuration diagram illustrating a direct current bus control system according to this embodiment. The direct current bus control system illustrated in FIG. 1 includes, as an input power supply, a photovoltaic power generation system 10 and a wind-power generation system 20, which are renewable energy power supply systems. These power generation systems 10 and 20 are connected in parallel, and the output sides of the power generation systems 10 and 20 are connected to the direct current bus 70. The photovoltaic power generation system 10 includes a photovoltaic cell 11 and a power converter 12, and the wind-power generation system 20 includes a wind-power generator 21 and a power converter 22.

The input power supply is not particularly limited. In a case where the input power supply is a renewable energy power supply system, the input power supply may be a power supply system that uses wave power or geothermal energy other than those described above, or may be a power supply system such as hydropower (small hydropower) power generation, tidal power generation, marine current power generation, ocean thermal energy power generation, or the like. The input power supply may also be a combination of those power supply systems including those listed above.

Further, the number of power supply systems connected in parallel with each other is not particularly limited.

The direct current bus 70 is connected to the main stabilizing device 30 and the sub-stabilizing devices 40, 50, and 60, and is also connected to the load 90.

The main stabilizing device 30 sets a variable bus voltage target value within a predetermined permissible range around a reference bus voltage (i.e., a reference voltage of the direct current bus 70), and controls charging and discharging of the power storage device 31 by operating the power converter 32 so that the output voltage at the side of the direct current bus 70 matches the bus voltage target value.

The sub-stabilizing device 40 calculates an input-&-output current target value on the basis of a difference between a charge-&-discharge threshold value and the voltage of the direct current bus, and controls charging and discharging of the power storage device 41 by operating the power converter 42 so that an input-&-output current matches the input-&-output current target value.

Herein, the power storage devices 31 and 41 are, for example, a battery (secondary battery), an electric double layer capacitor, a capacitor, a flywheel, a redox flow battery, or the like. The power converter 32 and 42 are, for example, an isolated DC-DC converter or a chopper, and can bidirectionally pass direct current power as indicated by arrows.

The sub-stabilizing device 50 causes the power converter 52 to perform DC-DC conversion so that the input-&-output current matches the input-&-output current target value calculated based on the difference between the charge threshold value and the voltage of the direct current bus, thus supplying direct current power to the water electrolysis cell 51 (a kind of charge operation) to electrolyze water to generate hydrogen gas and oxygen gas. When direct current power generated by electrochemical reaction of a fuel cell 61 is supplied to the direct current bus 70 via the power converter 62 (a kind of discharge operation), the sub-stabilizing device 60 causes the power converter 62 to perform DC-DC conversion so that the input-&-output current matches the input-&-output current target value calculated based on the difference between the discharge threshold value and the voltage of the direct current bus.

The configurations of the sub-stabilizing device 50 and the sub-stabilizing device 60 described above are merely examples. Examples of substitutes for the water electrolysis cell 51 include means for electrochemically producing C—H bonds ($CH_4$, $C_2H_4$, and the like) and alcohol by reducing carbon dioxide and means for producing ammonia by reducing nitrogen. Examples of substitutes for the fuel cell 61 include a fuel cell using alcohol and power generation means that rotates turbines and the like by combusting chemical substances (hydrogen, substances having C—H bonds, alcohol, ammonia, or the like).

Figure 2:
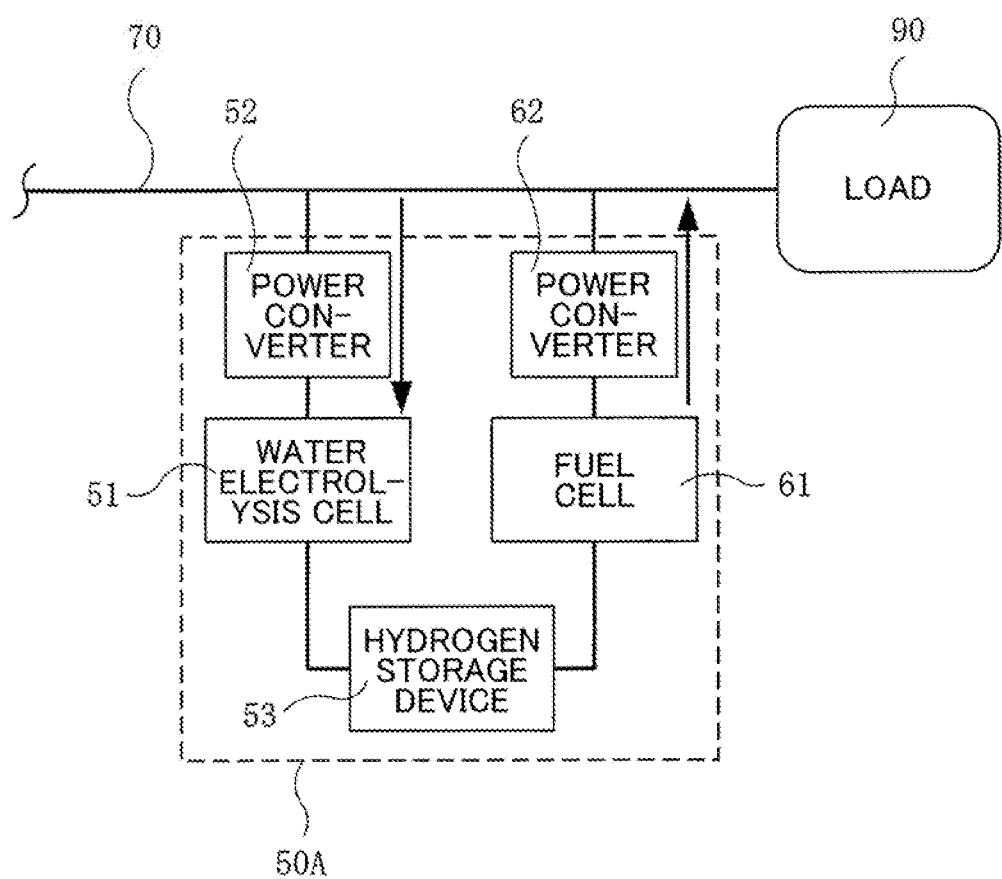
FIG. 2 is a configuration diagram illustrating another example of a sub-stabilizing device according to an embodiment.

FIG. 2 is another example of configuration of the sub-stabilizing device. As illustrated in the drawing, the sub-stabilizing devices 50 and 60 explained above may be a sub-stabilizing device 50A of an integrated structure in which the hydrogen storage device 53 is shared.

In FIG. 1, the power storage devices 31 and 41 are capable of charging and discharging direct current power. The water electrolysis cell 51 (and the hydrogen storage device 53 of FIG. 2) can convert direct current power into gas and accumulate the generated gas, and the fuel cell 61 (and the same hydrogen storage device 53) can perform power generation operation for converting the gas into direct current power. The power storage devices 31 and 41 constitute a charge-&-discharge element. The water electrolysis cell 51 (and the hydrogen storage device 53) constitute a charge element. The fuel cell 61 (and the hydrogen storage device 53) constitute a discharge element.

In this manner, each of the stabilizing devices 30, 40, 50, and 60 can be deemed as a power buffer for exchanging direct current power with the direct current bus 70 according to the operation of the power converters 32, 42, 52, and 62. The main stabilizing device 30 and the sub-stabilizing device 40 are power buffers having charge-&-discharge function. The sub-stabilizing device 50 is a power buffer having a charge function. The sub-stabilizing device 60 is a power buffer having a discharge function.

Only one main stabilizing device 30 having a setting function for setting the bus voltage target value may be provided. Conversely, any required number of sub-stabilizing devices may be provided according to the number of power supply systems connected in parallel and the power demanded by the load 90.

The monitoring-&-instruction device 80 collects state information (e.g., a voltage, a current, a temperature, and the like) about each of the power generation systems 10 and 20, the main stabilizing device 30, and the sub-stabilizing devices 40, 50, and 60 to monitor the state and the operation, and generates an operation instruction (start and stop instructions and the like), a charge-&-discharge threshold value instruction, and the like, on the basis of these monitor results. Various monitor signals and instructions can be transmitted and received between the monitoring-&-instruction device 80 and each of the above-described units by wire or wirelessly.

The load 90 may be a direct current load such as a direct current electric motor and the like, or a DC/AC converter converting direct current power into alternating current power and an alternating current load therefor. Alternating current power system may be connected to the direct current bus 70 via a DC/AC converter.

Subsequently, the configuration of each part in FIG. 1 will be described. In the configuration of FIG. 1, the photovoltaic power generation system 10 and the wind-power generation system 20 are provided as input power supplies.

The photovoltaic power generation system 10 and the wind-power generation system 20 have a common function in that both convert a power generated using renewable energy into direct current power with the power converters 12 and 22 and supply the direct current power to the direct current bus 70. Therefore, the photovoltaic power generation system 10 will be described below as an example.

Figure 3:
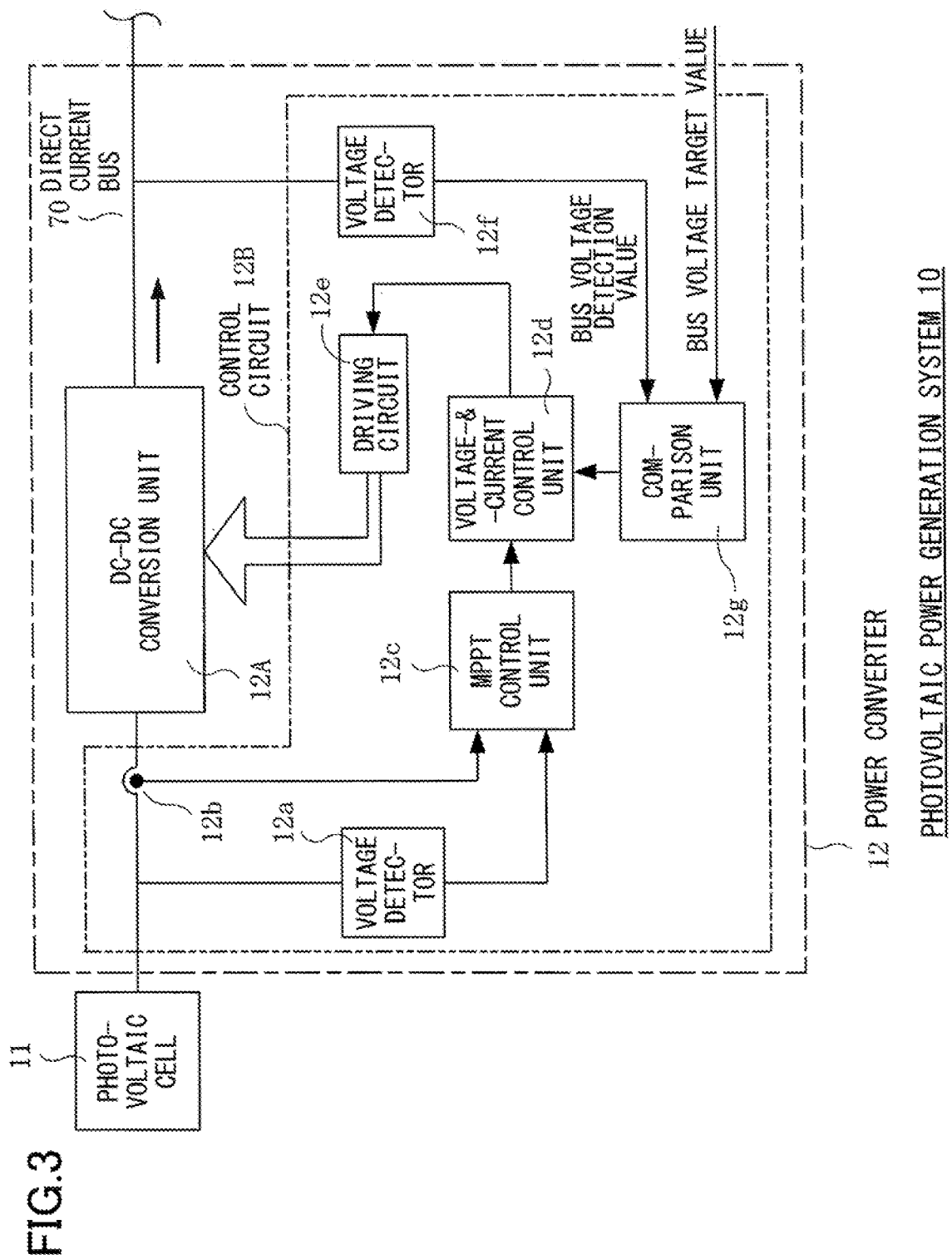
FIG. 3 is a block diagram illustrating an example of configuration of a power converter in a photovoltaic power generation system.

FIG. 3 is a block diagram illustrating an example of configuration of the power converter 12 in the photovoltaic power generation system 10. This power converter 12 includes a DC-DC conversion unit 12A and a control circuit 12B.

The DC-DC conversion unit 12A converts a direct current output voltage of the photovoltaic cell 11 into a direct current voltage of a predetermined magnitude according to an operation of a semiconductor switching device, and outputs the converted direct current voltage to the direct current bus 70. For example, the DC-DC conversion unit 12A is constituted by a boost chopper.

In the control circuit 12B controlling the DC-DC conversion unit 12A, a voltage detector 12a and a current detector 12b detect a voltage and a current, respectively, which are output from the photovoltaic cell 11, and these detection values are input into the MPPT control unit 12c. The MPPT control unit 12c searches a maximum output point of the photovoltaic cell 11 based on the hill climbing method and the like to output the maximum output point to the voltage-&-current control unit 12d.

The voltage-&-current control unit 12d generates a driving pulse according to PWM (pulse width modulation) control and the like, and sends the driving pulse to a driving circuit 12e. The driving circuit 12e turns ON and OFF a semiconductor switching device of the DC-DC conversion unit 12A on the basis of the driving pulse.

The voltage of the direct current bus 70 is detected by a voltage detector 12f, and this bus voltage detection value and a bus voltage target value sent from the main stabilizing device 30 described later are input into a comparison unit 12g. The comparison unit 12g generates a control signal corresponding to a deviation between the bus voltage detection value and the bus voltage target value and outputs the control signal to the voltage-&-current control unit 12d.

The voltage-&-current control unit 12d calculates a driving pulse for causing the bus voltage detection value to match the bus voltage target value on the basis of the above control signal. For example, in a case where the bus voltage detection value exceeds the bus voltage target value, the voltage-&-current control unit 12d performs control operation (including operation stop) so as to decrease the output voltage of the DC-DC conversion unit 12A.

Figure 4:
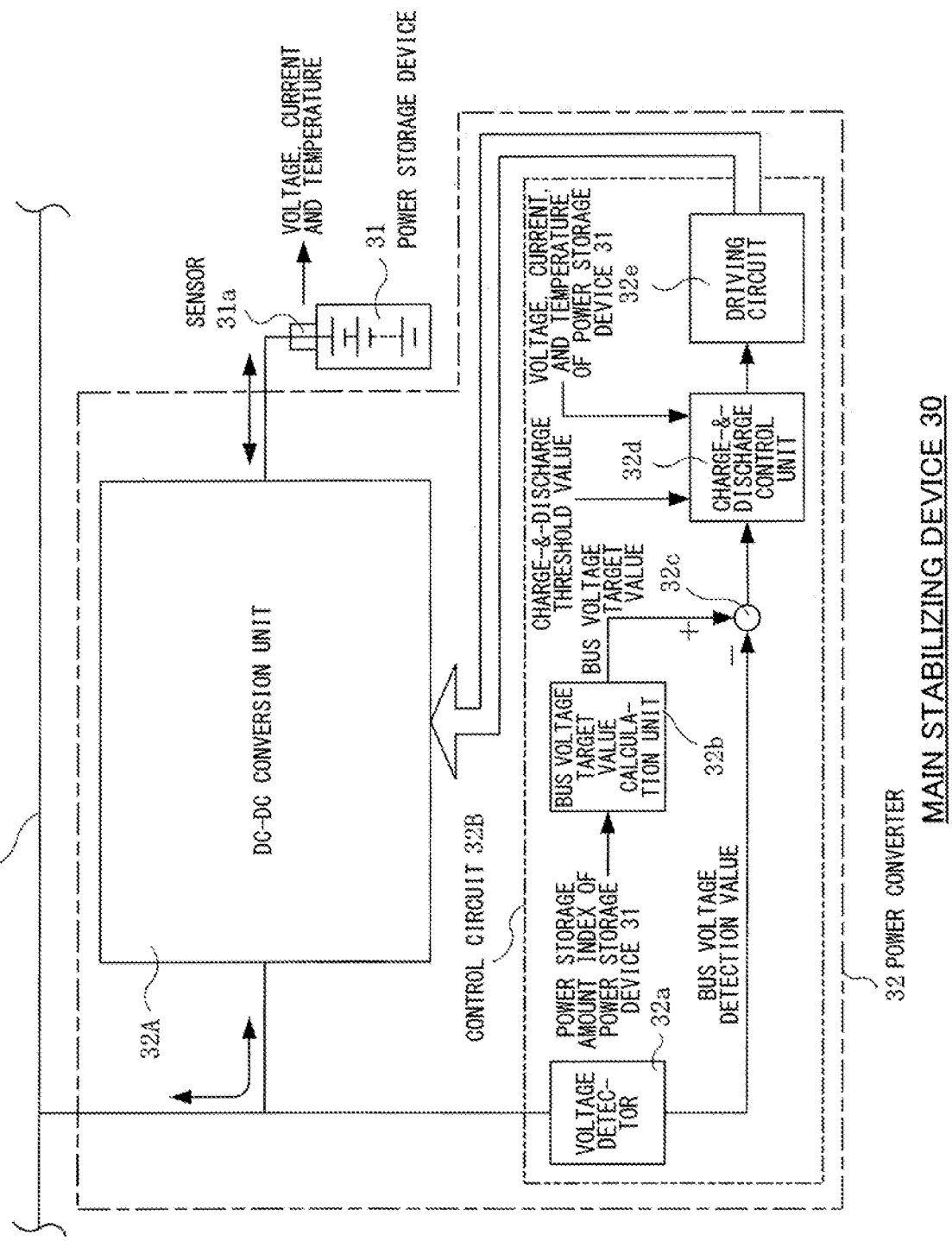
FIG. 4 is a block diagram illustrating an example of configuration of a power converter in a main stabilizing device.

FIG. 4 is a block diagram illustrating an example of configuration of the power converter 32 in the main stabilizing device 30. This power converter 32 includes a DC-DC conversion unit 32A and a control circuit 32B.

The DC-DC conversion unit 32A has a function of controlling charging and discharging of the power storage device 31 by bidirectionally passing direct current power between the direct current bus 70 and the power storage device 31. The DC-DC conversion unit 32A is constituted by an isolated DC-DC converter, a chopper, and the like having a semiconductor switching device. The power storage device 31 is provided with a sensor 31a for detecting a voltage, a current, and a temperature. The configuration of the control circuit 32B is as follows.

The voltage detector 32a detects the voltage of the direct current bus 70, and the bus voltage target value calculation unit 32b calculates a bus voltage target value according to the power storage amount index of the power storage device 31. The method for calculating the bus voltage target value will be explained later.

An example of the power storage amount index is a state of charge (SOC) obtained by integrating charge-&-discharge currents of the power storage device 31 detected by the sensor 31a.

A subtractor 32c calculates a difference between the bus voltage target value and the bus voltage detection value, and outputs this voltage difference to the charge-&-discharge control unit 32d.

The charge-&-discharge control unit 32d receives the voltage, the current, and the temperature of the power storage device 31, and also receives the charge-&-discharge threshold value. In view of input information, the charge-&-discharge control unit 32d generates a driving pulse by performing PWM control and the like so that the bus voltage detection value matches the bus voltage target value. A driving circuit 32e turns on and off the semiconductor switching device of the DC-DC conversion unit 32A according to the driving pulse. In this manner, the DC-DC conversion unit 32A controls charging and discharging of the power storage device 31 to cause the bus voltage detection value to match the bus voltage target value.

It should be noted that the charge-&-discharge threshold value of the power storage device 31 may be set by the control circuit 32B, or may be received as an instruction from the monitoring-&-instruction device 80 of FIG. 1.

Figure 5:
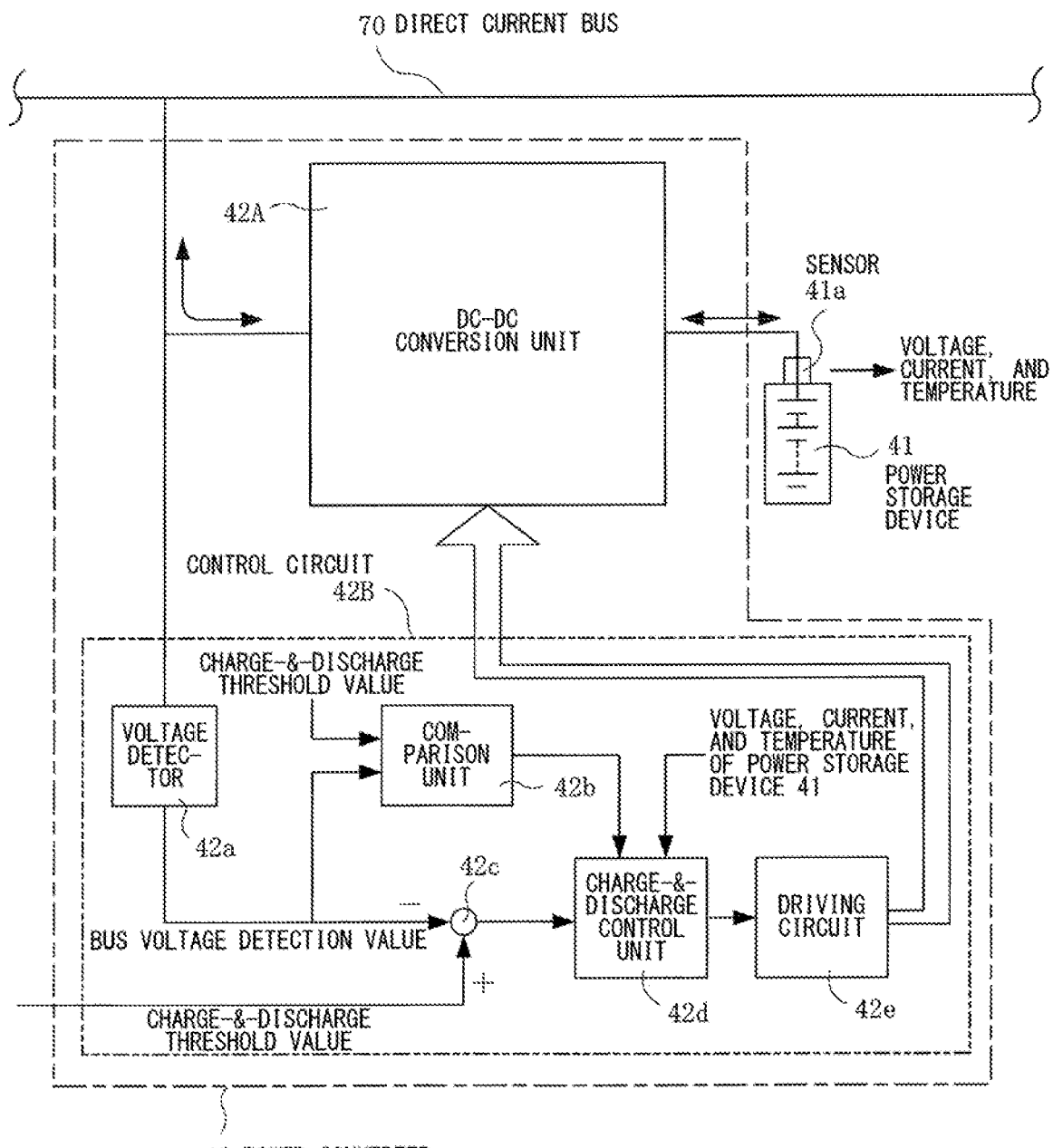
FIG. 5 is a block diagram illustrating an example of configuration of a power converter in a sub-stabilizing device.

FIG. 5 is a block diagram illustrating an example of configuration of the power converter 42 in the sub-stabilizing device 40 of FIG. 1. This power converter 42 includes a DC-DC conversion unit 42A and a control circuit 42B. The power converter 42 has a function similar to the power converter 32 of FIG. 4 in that the power converter 42 bidirectionally passes direct current power between the direct current bus 70 and the power storage device 41. Like the power storage device 31, the power storage device 41 is provided with a sensor 41a for detecting a voltage, a current, and a temperature. The control circuit 42B includes a voltage detector 42a, a comparison unit 42b, a subtractor 42c, a charge-&-discharge control unit 42d, and a driving circuit 42e.

The power converter 42 illustrated in FIG. 5 is different from the power converter 32 of FIG. 4 in the following features. In the control circuit 42B, the charge-&-discharge control unit 42d calculates an input-&-output current target value on the basis of a difference between a charge-&-discharge threshold value and the bus voltage detection value. Further, the charge-&-discharge control unit 42d controls charging and discharging of the power storage device 41 so that the input-&-output current of the DC-DC conversion unit 42A matches the input-&-output current target value. Herein, the charge-&-discharge threshold value may be a threshold value (a charge threshold value and a discharge threshold value) of charging and discharging of the power storage device 41. The input-&-output current target value may be determined in accordance with a difference between this threshold value and the voltage of the direct current bus 70.

The comparison unit 42b provided in the control circuit 42B compares the charge-&-discharge threshold value of the power storage device 41 with the bus voltage detection value, and controls operation of the charge-&-discharge control unit 42d by outputting a charge instruction or a discharge instruction in accordance with a relationship in magnitude between the charge threshold value or the discharge threshold value and the bus voltage detection value. It should be noted that the charge-&-discharge threshold value may be set by the control circuit 42B, or may be received as an instruction from the monitoring-&-instruction device 80.

Figure 6:
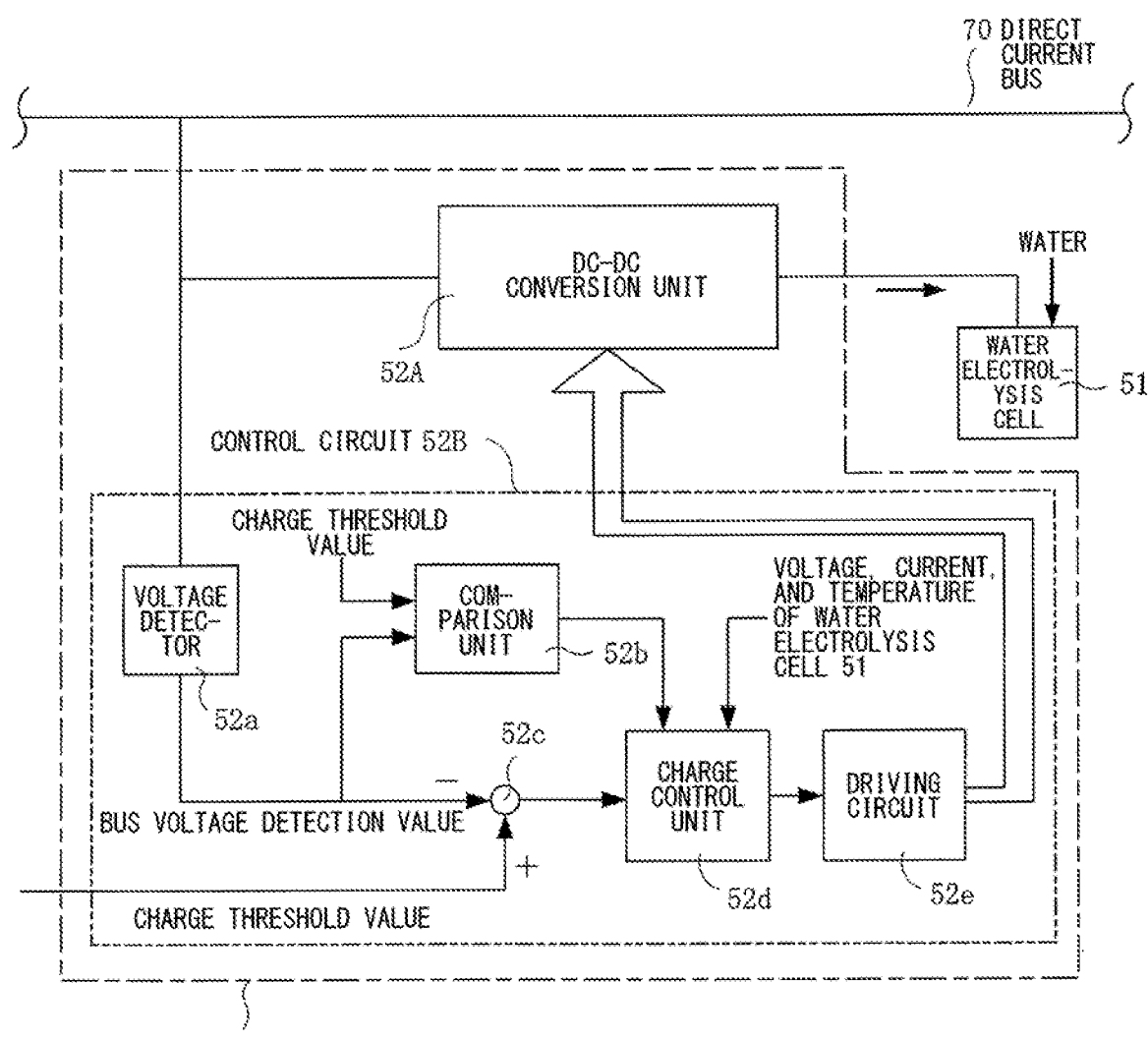
FIG. 6 is a block diagram illustrating an example of configuration of a power converter in a sub-stabilizing device.

FIG. 6 is a block diagram illustrating an example of configuration of the power converter 52 in the sub-stabilizing device 50. This power converter 52 includes a DC-DC conversion unit 52A and a control circuit 52B.

The DC-DC conversion unit 52A has a function of converting direct current power of the direct current bus 70 to a predetermined level and supplying the converted direct current power to the water electrolysis cell 51. The DC-DC conversion unit 52A is constituted by an isolated DC-DC converter, a chopper, and the like having a semiconductor switching device. The water electrolysis cell 51 performs an operation electrolyzing water using the direct current power supplied from the DC-DC conversion unit 52A and storing the generated hydrogen gas in an external storage device (not illustrated). In other words, the water electrolysis cell 51 performs a kind of charge operation.

The control circuit 52B controlling the DC-DC conversion unit 52A is configured in a manner substantially similar to the control circuit 42B of FIG. 5.

More specifically, in the control circuit 52B of FIG. 6, a voltage detector 52a detects a voltage of the direct current bus 70, and a subtractor 52c calculates a difference between a charge threshold value and the bus voltage detection value, and this voltage difference is input to the charge control unit 52d. The bus voltage detection value and the charge threshold value are also input to a comparison unit 52b. When the bus voltage detection value is more than the charge threshold value, the comparison unit 52b outputs a charge instruction to the charge control unit 52d. Herein, the charge threshold value corresponds to a voltage at which the water electrolysis cell 51 starts electrolysis. In other words, the charge threshold value is a threshold value for charging of the water electrolysis cell 51.

The charge control unit 52d calculates an input-&-output current target value on the basis of the voltage difference received from the subtractor 52c, generates a driving pulse as a charge instruction so that the input-&-output current of the DC-DC conversion unit 52A matches the input-&-output current target value, and outputs the generated driving pulse to a driving circuit 52e. The driving circuit 52e turns on and off a semiconductor switching device in the DC-DC conversion unit 52A in accordance with the driving pulse, thus supplying direct current power to the water electrolysis cell 51 and electrolyzing water.

While the DC-DC conversion unit 52A controls the direct current power supplied to the water electrolysis cell 51 according to the above operation, the DC-DC conversion unit 52A operates so as to cause the input-&-output current to match the input-&-output current target value.

In the sub-stabilizing device 60 of FIG. 1, the power generation operation performed by the power generation operation by the fuel cell 61 may be deemed as a discharge operation, and accordingly, the water electrolysis cell 51, the charge threshold value, and the charge control unit 52d of the sub-stabilizing device 50 illustrated in FIG. 6 may be read as the fuel cell 61, a discharge threshold value, and a discharge control unit, respectively. In this case, the discharge threshold value corresponds to a start voltage of power generation by the fuel cell 61.

When the bus voltage detection value falls below the discharge threshold value, the sub-stabilizing device 60 outputs a driving pulse corresponding to the discharge instruction to the discharge control unit to cause the DC-DC conversion unit to perform operation to supply the power generated by the fuel cell 61 to the direct current bus 70 via the DC-DC conversion unit.

While the DC-DC conversion unit controls the power to be generated by the fuel cell 61 according to the above operation, the DC-DC conversion unit operates so as to cause the input-&-output current to match the input-&-output current target value.

The water electrolysis cell 51 and the fuel cell 61 are also provided with sensors for detecting voltages, currents, and temperatures, and these detection values are input to the charge control unit 52d and the discharge control unit. For the sake of convenience, the sensors are not illustrated.

The charge threshold value and the discharge threshold value may be set by a corresponding control circuit, or may be received as an instruction from the monitoring-&-instruction device 80.

The power converters 12, 32, 42, and 52 illustrated in FIG. 3 to FIG. 6, and in particular, the configuration and the operation of the control circuits 12B, 32B, 42B, and 52B, are merely examples, and are not intended to limit the technical scope of the present invention any way, and it is to be understood that a configuration different from the above may be adopted.

Figure 7:
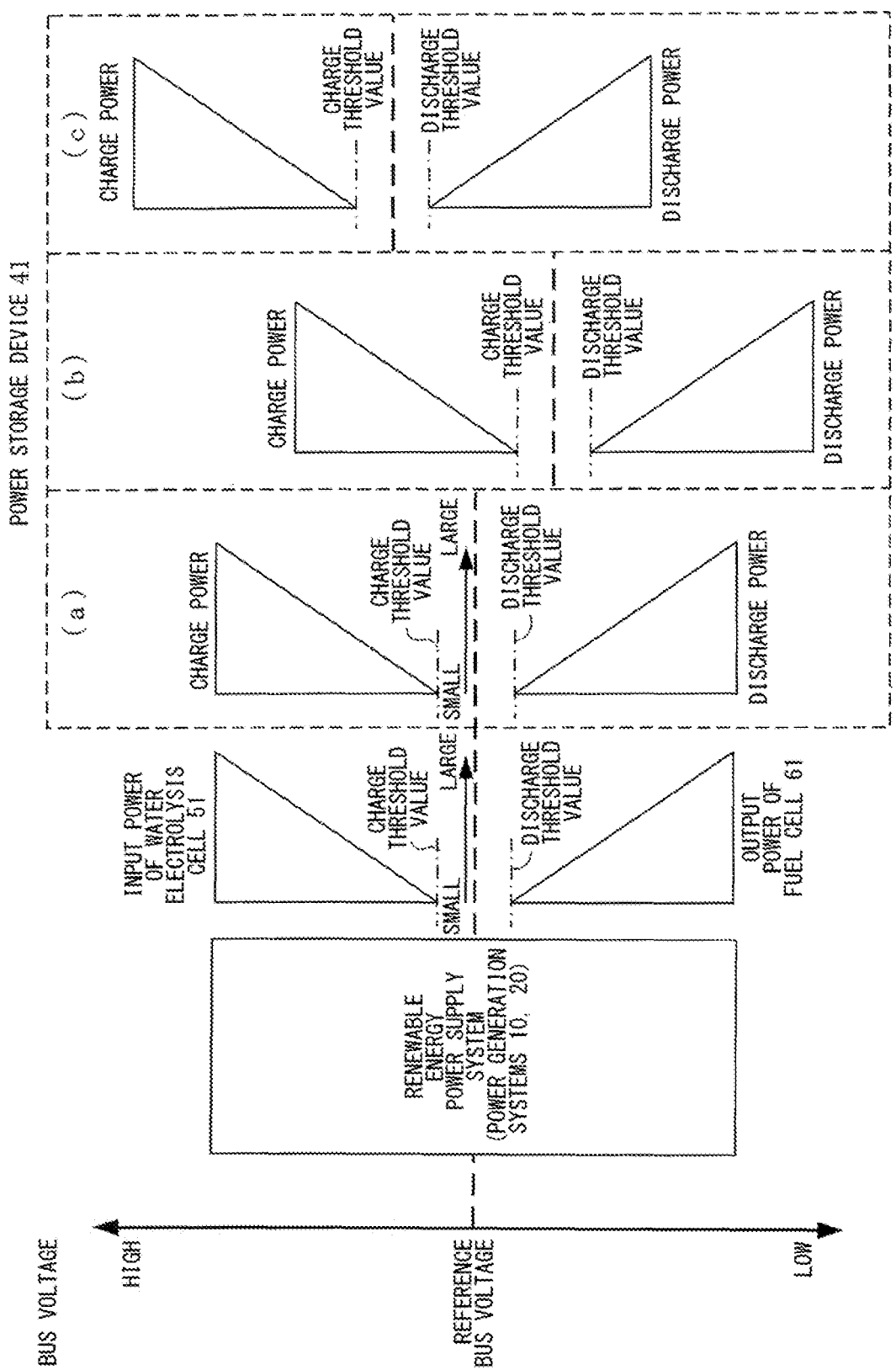
FIG. 7 is a conceptual diagram schematically illustrating a relationship between: charge-&-discharge powers of a power storage device, an input power of a water electrolysis cell, an output power of a fuel cell, and the like; and a bus voltage.

Subsequently, FIG. 7 is a conceptual diagram schematically illustrating a relationship between: charge-&-discharge powers of the power storage device 41 of the sub-stabilizing device 40, an input power of the water electrolysis cell 51 of the sub-stabilizing device 50, and an output power of the fuel cell 61 of the sub-stabilizing device 60; and the voltage of the direct current bus 70. The width of each triangular symbol in FIG. 7 indicates the magnitude of the power. The wider the width of the triangular symbol is, the larger the value of the power is.

FIG. 7 illustrates an example in which the input power supply is a renewable energy power supply system. The renewable energy power supply system is, for example, the photovoltaic power generation system 10 and/or the wind-power generation system 20 of FIG. 1. The charge-&-discharge operation of each unit is controlled in accordance with the voltage of the direct current bus 70 to which the generated power is supplied and the charge-&-discharge threshold values and the like of the power storage device 41, the water electrolysis cell 51, and the fuel cell 61.

For example, as illustrated in a case (a) for the power storage device 41, the higher the bus voltage is relative to the charge threshold value of the power storage device 41, the larger the charge power supplied to the power storage device 41 becomes, and the lower the bus voltage is relative to the discharge threshold value of the power storage device 41, the larger the discharge power discharged from the power storage device 41 becomes. Likewise, the higher the bus voltage is relative to the charge threshold value of the water electrolysis cell 51, the larger the charge power supplied to the water electrolysis cell 51 becomes, and the lower the bus voltage is relative to the discharge threshold value of the fuel cell 61, the larger the discharge power generated by the fuel cell 61 becomes.

A case (b) for the power storage device 41 relates to a case where the charge threshold value and the discharge threshold value are set to values lower than the case (a) according to a reference bus voltage. A case (c) relates to a case where the charge threshold value and the discharge threshold value are set to values higher than the case (a). A similar setting change operation of the threshold value can also be performed for the charge threshold value of the water electrolysis cell 51 and the discharge threshold value of the fuel cell 61.

In this manner, the direct current power exchanged between the direct current bus 70 and the sub-stabilizing devices 40, 50, and 60 can be individually adjusted by controlling the charge-&-discharge operation by changing the charge threshold values and the discharge threshold values of the power storage device 41, the water electrolysis cell 51, and the fuel cell 61. In other words, the operation for the power buffer can be more finely controlled in each of the sub-stabilizing devices 40, 50, and 60.

As described above, the changes of the charge threshold values and the discharge threshold values can be performed on the basis of an instruction from the monitoring-&-instruction device 80 or by the power converters 42, 52, and 62.

Figure 8B:
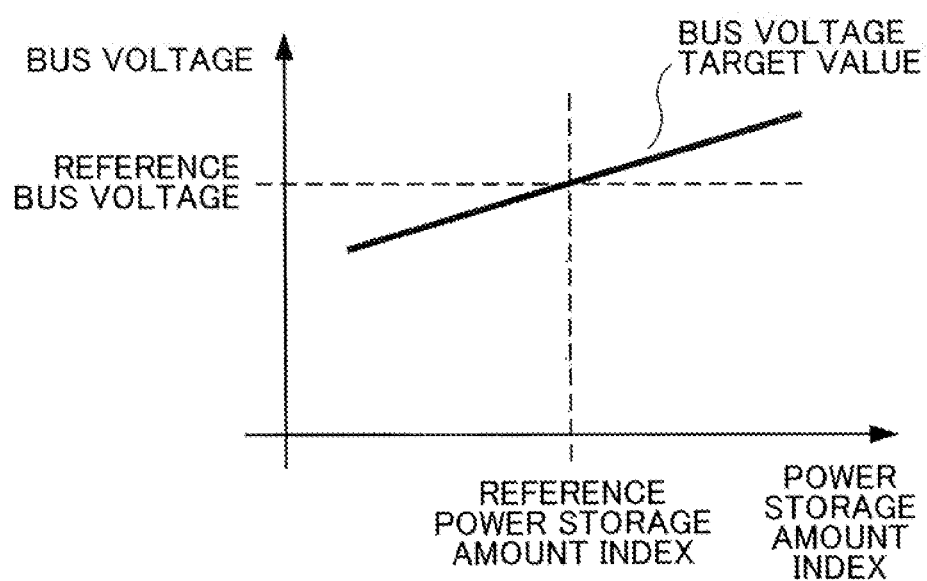
FIG. 8B is a drawing for explaining an operation of the main stabilizing device.

FIGS. 8A and 8B are drawings for explaining an operation of the main stabilizing device 30. As indicated by a thick broken line in FIG. 8A, the main stabilizing device 30 passes direct current power between the direct current bus 70 and the power storage device 31, and controls charging and discharging of the power storage device 31. The control circuit 32B in the power converter 32 sets a bus voltage target value on the basis of the power storage amount index (for example, a state of charge) of the power storage device 31 according to characteristics as illustrated in FIG. 8B, for example.

Within a permissible range of the voltage of the direct current bus 70, this bus voltage target value is set to a higher value as the power storage amount index is larger, and is set to a lower value as the power storage amount index is smaller. The control circuit 32B controls the DC-DC conversion unit 32A so as to cause the bus voltage detection value to match this bus voltage target value.

Figure 9A:
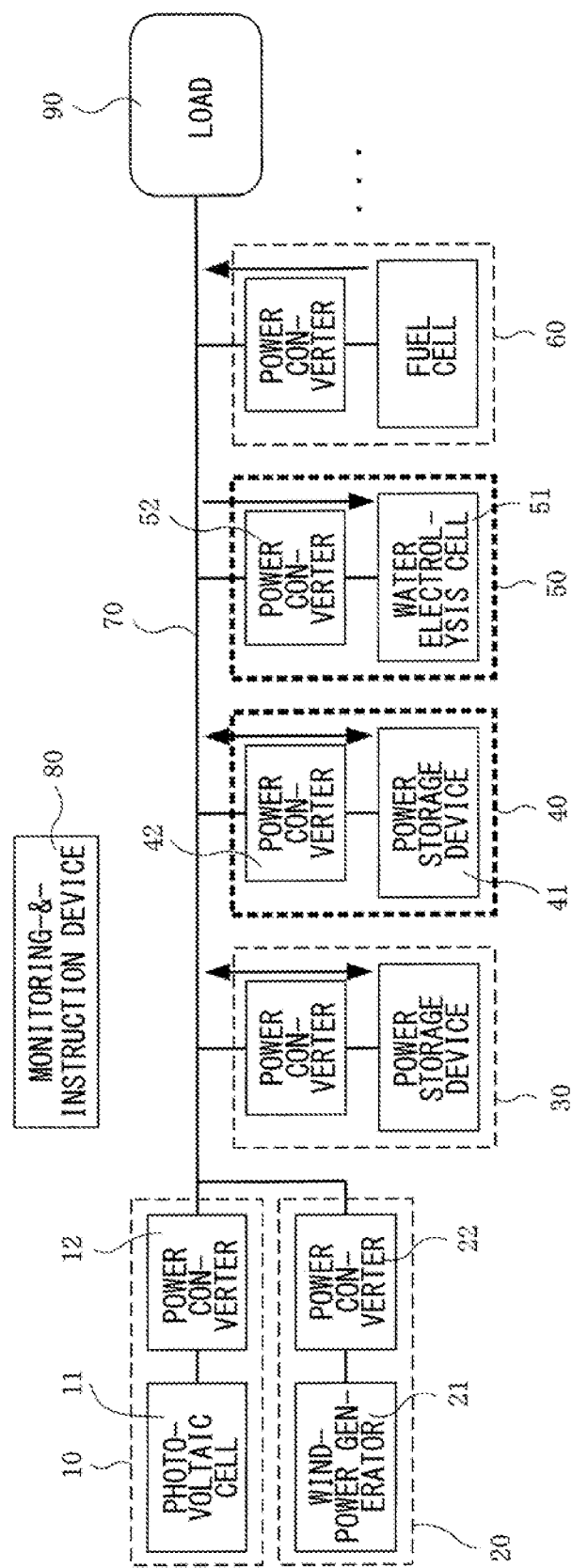
FIG. 9A is a drawing for explaining an operation of the sub-stabilizing device.
Figure 9B:
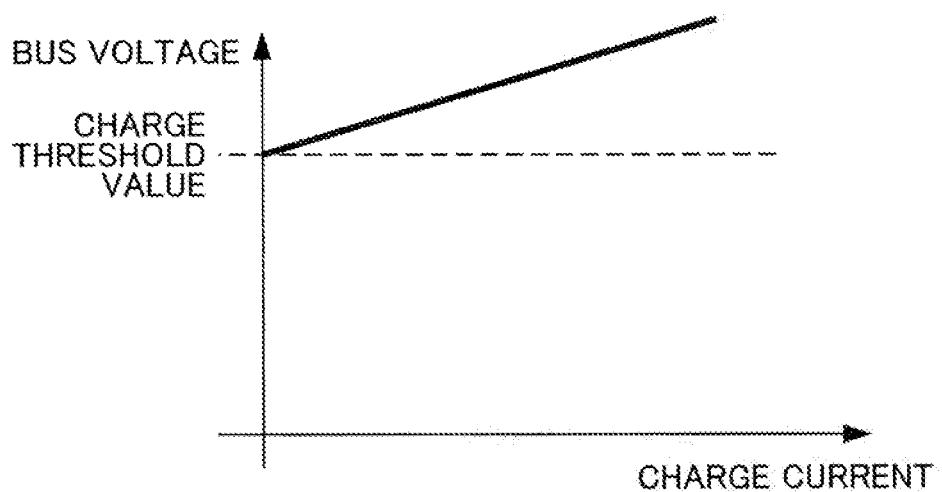
FIG. 9B is a drawing for explaining an operation of the sub-stabilizing device.

FIGS. 9A and 9B are drawings for explaining operations of the sub-stabilizing devices 40 and 50.

As indicated by thick broken lines in FIG. 9A, the power converter 42 of the sub-stabilizing device 40 charges the power storage device 41 by using the direct current power of the direct current bus 70, and the power converter 52 of the sub-stabilizing device 50 supplies the direct current power of the direct current bus 70 to the water electrolysis cell 51 to electrolyze water.

Figure 10A:
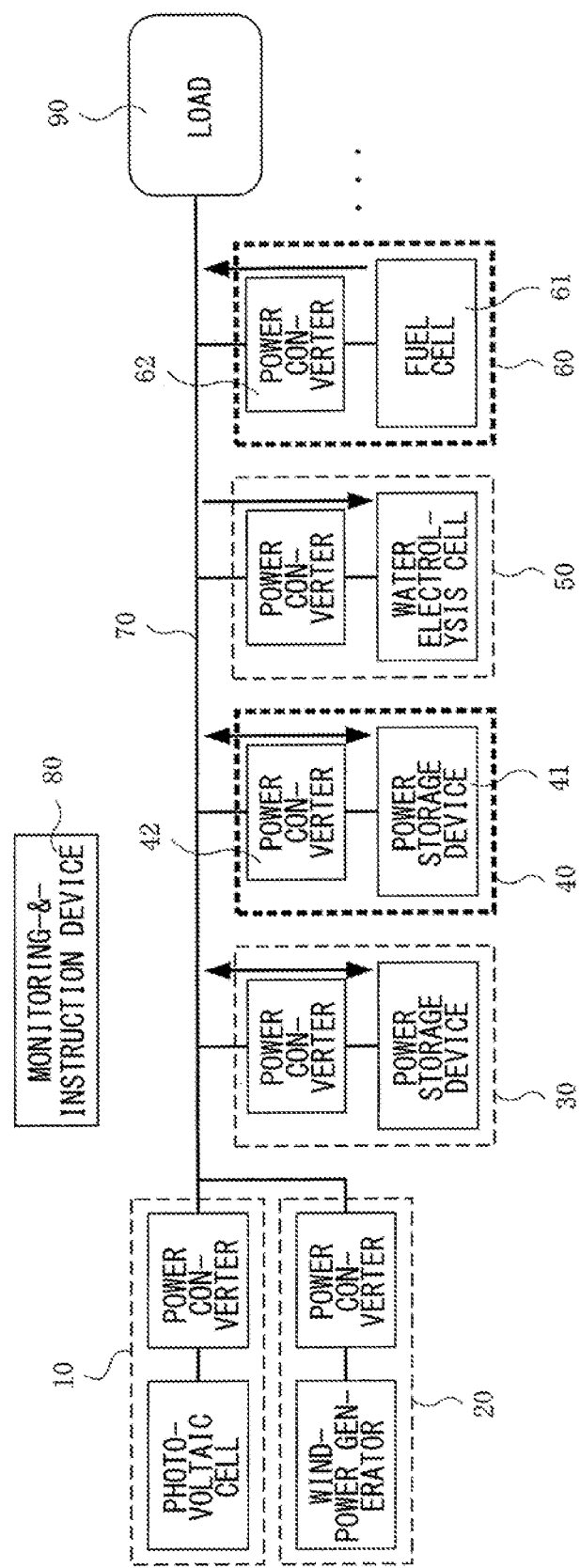
FIG. 10A is a drawing for explaining an operation of the sub-stabilizing device.
Figure 10B:
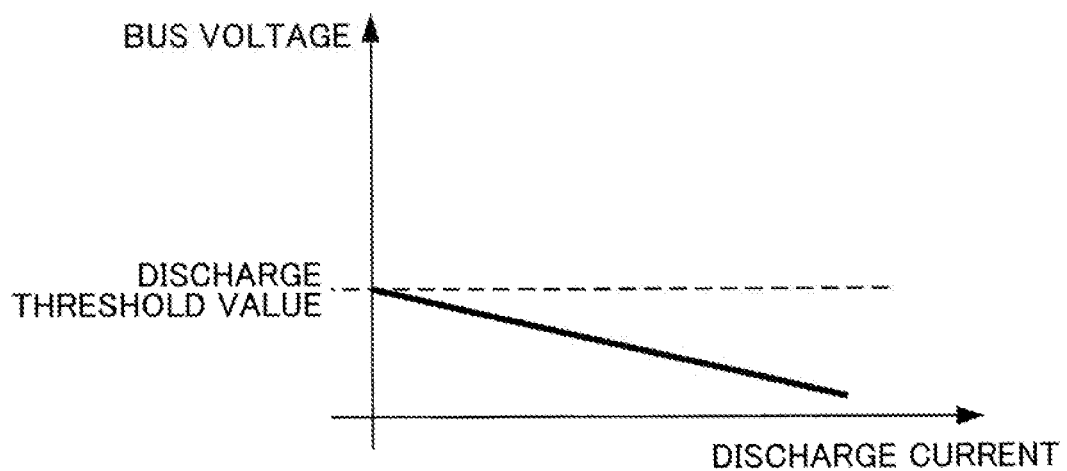
FIG. 10B is a drawing for explaining an operation of the sub-stabilizing device.

The charge characteristics in this case are as illustrated in FIG. 9B. Each of the power converters 42 and 52 is controlled so that, the higher the voltage of the direct current bus 70 is relative to the charge threshold value of the power storage device 41 or the water electrolysis cell 51, the larger the charge current becomes. FIGS. 10A and 10B are drawings for explaining operations of the sub-stabilizing devices 40 and 60.

As illustrated by thick broken lines in FIG. 10A, the power converter 42 of the sub-stabilizing device 40 causes the power storage device 41 to discharge and supply direct current power to the direct current bus 70, and the power converter 62 of the sub-stabilizing device 60 causes the fuel cell 61 to perform power generation operation to supply direct current power to the direct current bus 70.

The charge characteristics in this case are as illustrated in FIG. 10B. Each of the power converters 42 and 62 is controlled so that, the lower the voltage of the direct current bus 70 is relative to the discharge threshold value of the power storage device 41 or the fuel cell 61, the larger the discharge current becomes.

Subsequently, a simulation performed to verify the effects of the disclosed technology will be described.

Figure 11:
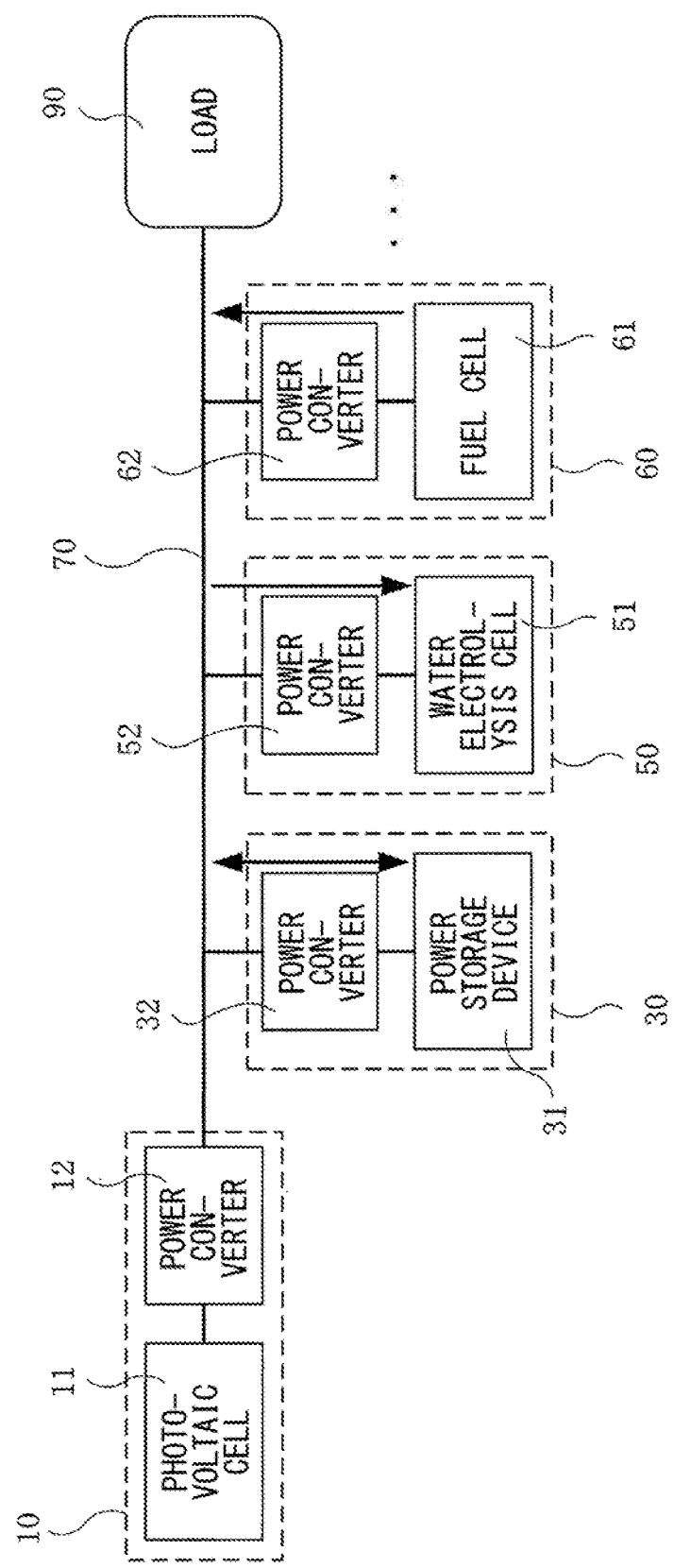
FIG. 11 is a configuration diagram illustrating a model of a direct current bus control system used for simulation.

FIG. 11 illustrates a model of a direct current bus control system used for simulation, and includes the photovoltaic power generation system 10, the main stabilizing device 30, the sub-stabilizing devices 50 and 60, the direct current bus 70, and the load 90.

Herein, the power converter 12 of the photovoltaic power generation system 10 is assumed to perform MPPT (maximum power point tracking) control for changing current drawn and voltage with every 0.1 [sec].

The power converter 32 of the main stabilizing device 30 measures a charge-&-discharge current of the power storage device 31 to derive an estimated power storage amount index with every 0.1 [sec]. The bus voltage target value is calculated on the basis of this estimated power storage amount index, a reference power storage amount index, and a reference bus voltage.

Figure 12:
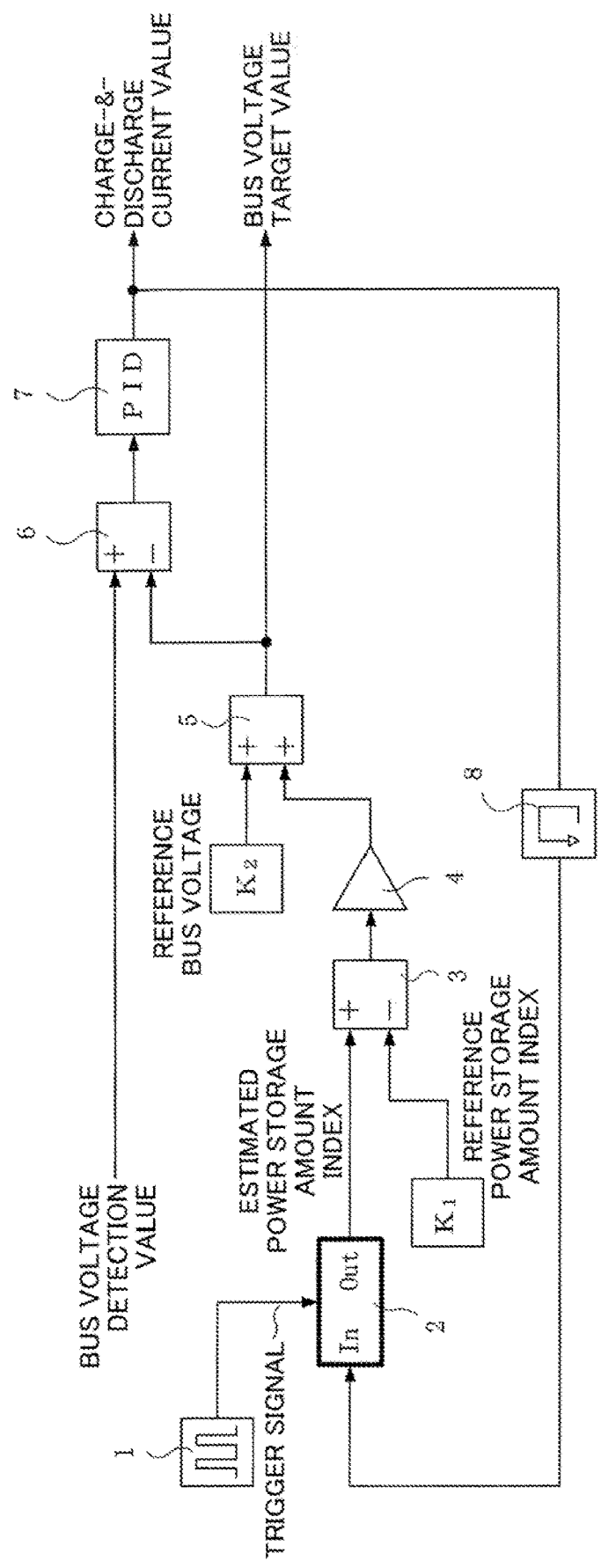
FIG. 12 is a block diagram illustrating a main part of the main stabilizing device used for simulation.

FIG. 12 is a block diagram illustrating a main part of the main stabilizing device 30. The configuration illustrated in FIG. 12 includes a pulse generator 1, an estimated power storage amount index calculation unit 2, subtractors 3 and 6, a gain multiplier 4, an adder 5, and a PID (proportional integral derivative) controller 7. K1 is a constant corresponding to the reference power storage amount index, and K2 is a constant corresponding to the reference bus voltage.

Figure 13:
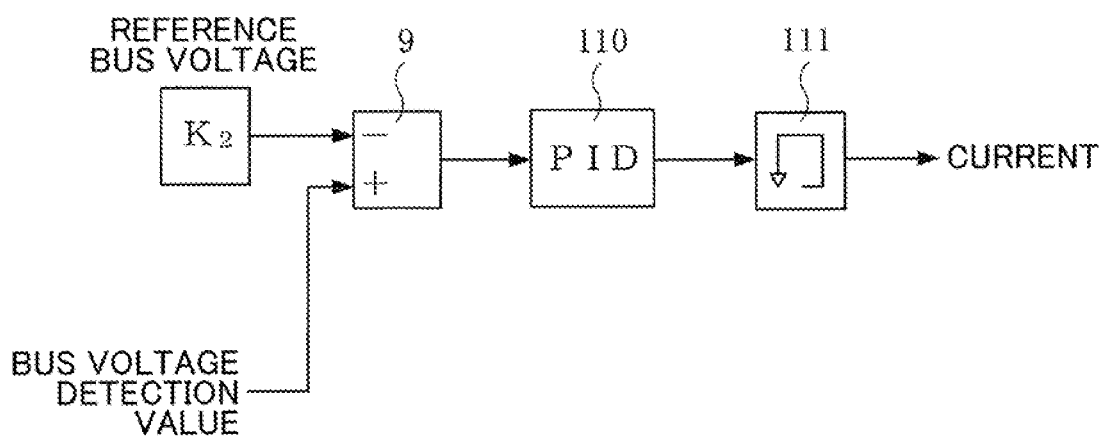
FIG. 13 is a block diagram illustrating a main part of the sub-stabilizing device used for simulation.

FIG. 13 is a block diagram illustrating a main part of the sub-stabilizing device 50 used for simulation. The configuration as illustrated in FIG. 13 includes: a subtractor 9 configured to derive a difference between the bus voltage detection value and the reference bus voltage; a PID controller 110 configured to operate so as to eliminate the difference; and a memory 111, and calculates a current to be output to the water electrolysis cell 51.

Figure 14:
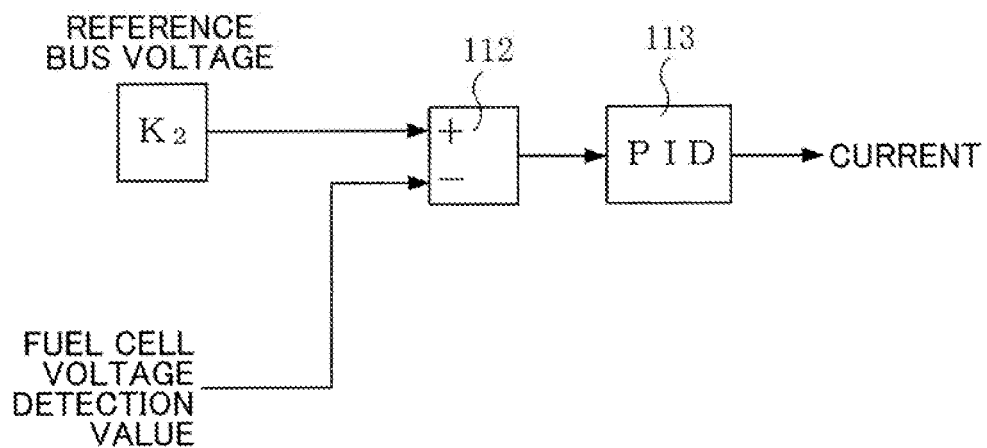
FIG. 14 is a block diagram illustrating a main part of the sub-stabilizing device used for simulation.

FIG. 14 is a block diagram illustrating a main part of the sub-stabilizing device 60 used for simulation. The configuration as illustrated in FIG. 14 includes: a subtractor 112 configured to derive a difference between the reference bus voltage and the voltage detection value of the fuel cell 61; and a PID controller 113 configured to operate so as to eliminate the difference, and calculates a power generation current by the fuel cell 61.

Figure 15:
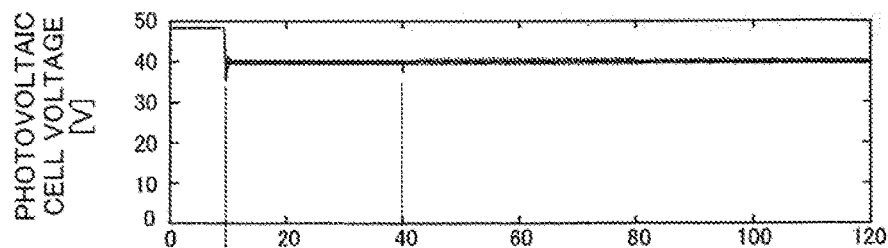
FIGS. 15(a)-(d) are waveform diagrams of voltages and currents of respective units, showing a result of a simulation.
Figure 15:
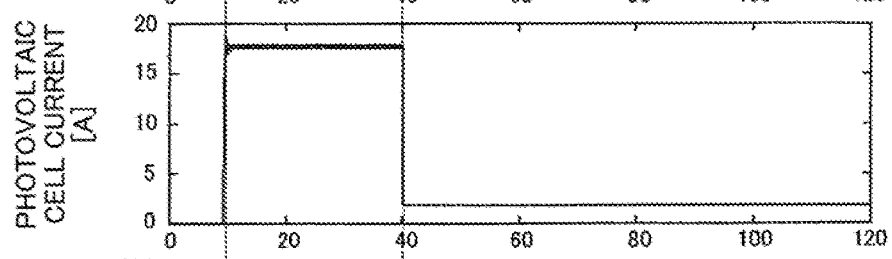
Figure 15:
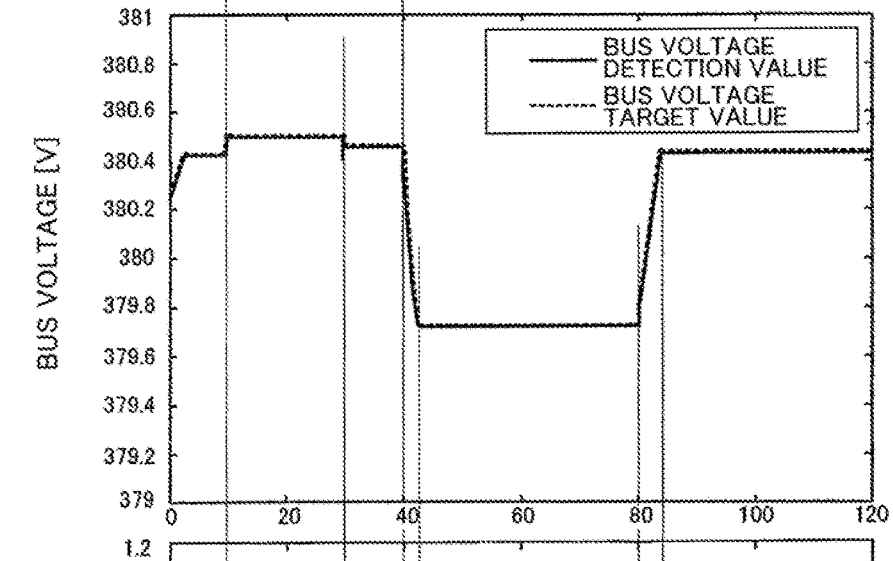
Figure 15:
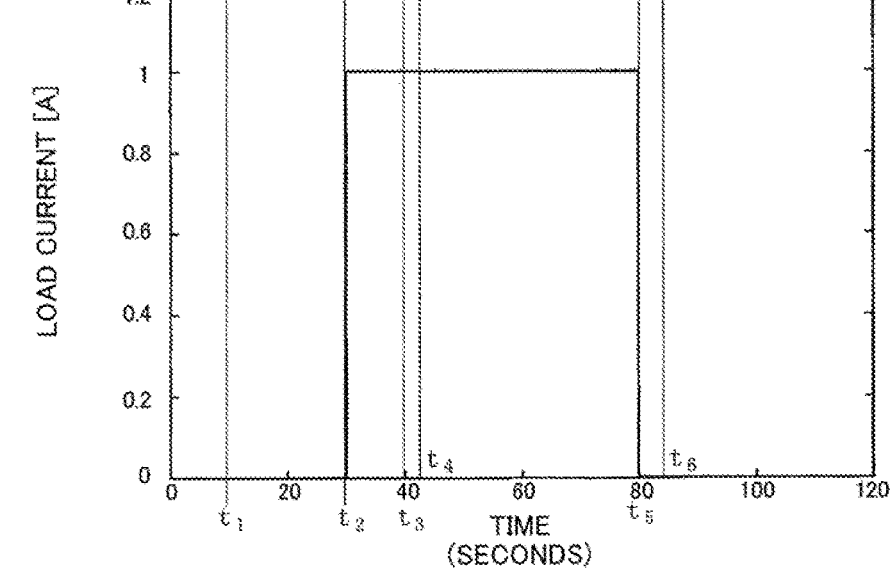
Figure 16:
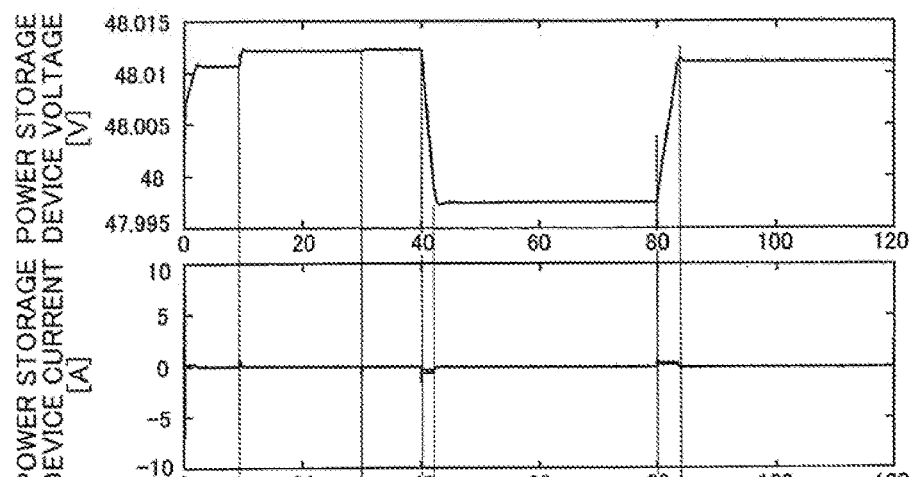
FIGS. 16(a)-(d) are waveform diagrams of voltages and currents of respective units showing the result of the simulation.
Figure 16:
Figure 16:
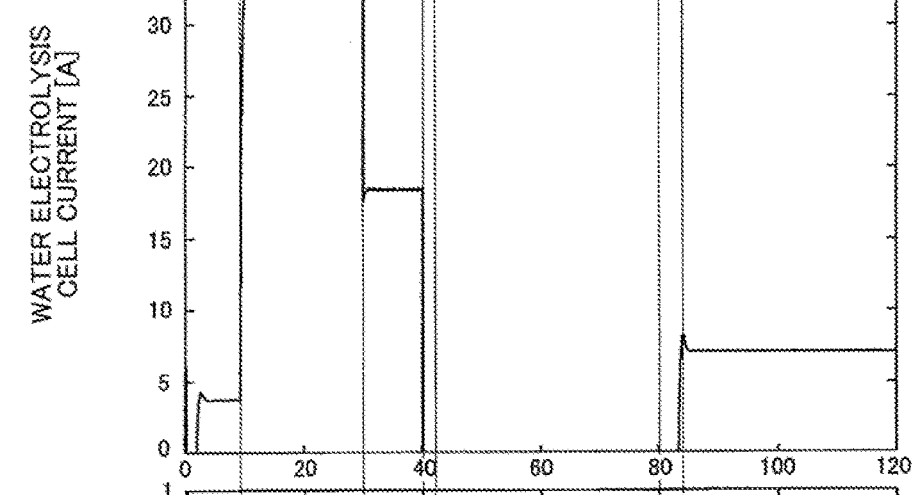
Figure 16:
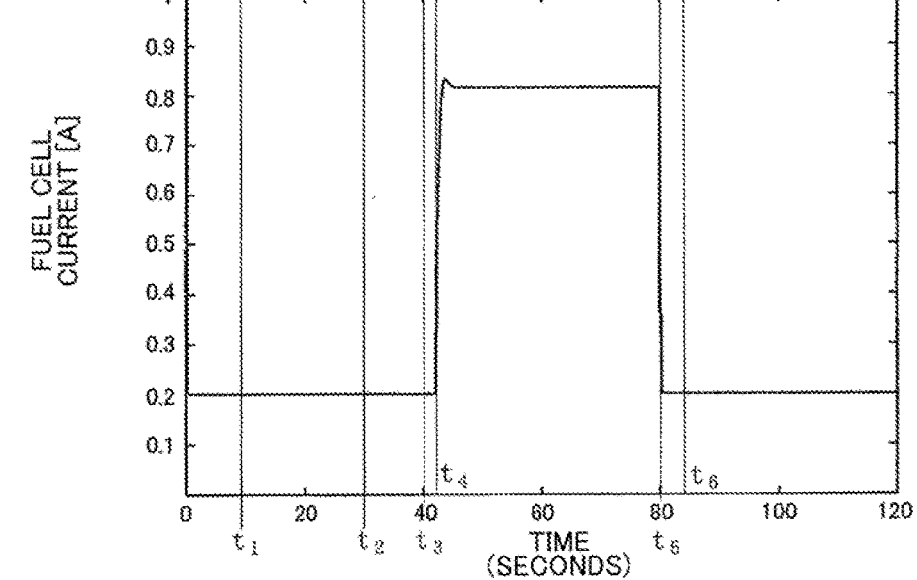

FIGS. 15(*a*)-(*d*) and FIGS. 16(*a*)-(*d*) are waveform diagrams of voltages and currents of respective units, showing a result of a simulation.

FIG. 15(a) indicates a voltage of the photovoltaic cell 11, FIG. 15 (b) indicates a current of the photovoltaic cell 11, FIG. 15(c) indicates a bus voltage, and FIG. 15(d) indicates a load current. FIG. 16(a) indicates a voltage of the power storage device 31, FIG. 16(b) indicates a current of the power storage device 31, FIG. 16(c) indicates a current of the water electrolysis cell 51, and FIG. 16(d) indicates a current of the fuel cell 61 (including a leakage current in a normal state).

Herein, voltages and currents of the respective units were simulated, in which at a time t1, the output current of the photovoltaic cell 11 rose, and thereafter, at a time t2, the load 90 was activated, and at a time t3 (=40 [sec]), the current of the photovoltaic cell 11 decreased, and at a time t5 (=80 [sec]), the load current became zero.

In response to the start of power generation by the photovoltaic cell 11 at time t1, when the bus voltage became higher than the charge threshold value of the power storage device 31 and the water electrolysis cell 51, the power storage device 31 and the water electrolysis cell 51 started to be charged, and accordingly, the voltage of the power storage device 31 became higher (FIG. 16(a)), and the input current of the water electrolysis cell 51 increased (FIG. 16(c)).

As a result, the power storage amount index of the power storage device 31 increased, and therefore, the bus voltage target value also became higher after time t1 (FIG. 15(c)).

When the load 90 was activated at time t2, the bus voltage slightly decreased (FIG. 15(c)).

At time t3, the current and the bus voltage of the photovoltaic cell 11 decreased, and when the bus voltage fell below the discharge threshold value of the power storage device 31, the power storage device 31 started to discharge, and accordingly, the voltage of the power storage device 31 decreased (FIG. 16(a), FIG. 16(b)). In FIG. 16(b), a current in the negative direction is a discharge current. Likewise, after time t3, the current of the water electrolysis cell 51 also became zero.

When the bus voltage fell below the discharge threshold value of the fuel cell 61, the output current of the fuel cell 61 increased at a time t4 immediately after time t3 (FIG. 16(d)), and after time t4, the bus voltage and the voltage of the power storage device 31 were maintained at a substantially constant value (FIG. 15(c), FIG. 16(a)).

Thereafter, when, at time t5, the load current became zero (FIG. 15(d)), the bus voltage began to rise, and when the bus voltage exceeded the discharge threshold value of the fuel cell 61, the discharge current from the fuel cell 61 became zero (FIG. 15(c), FIG. 16(d)). Since the bus voltage exceeded the charge threshold value of the power storage device 31, the power storage device 31 started to be charged, and continued to be charged until a time t6 (FIG. 16(a), FIG. 16(b)).

Furthermore, when the bus voltage exceeded the charge threshold value of the water electrolysis cell 51, the input current to the water electrolysis cell 51 increased until the voltage of the water electrolysis cell 51 became substantially equal to the bus voltage, and after time t6, the input current became a substantially constant value (FIG. 16(c)).

In the above operation, the bus voltage target value in FIG. 15(c) was calculated by the block diagram of the main stabilizing device 30 as illustrated in FIG. 12. The bus voltage detection value closely followed the bus voltage target value.

In response to the change in the output of the photovoltaic cell 11 and the change in the load current during the simulation period, the main stabilizing device 30 having the power storage device 31, the sub-stabilizing device 50 having the water electrolysis cell 51, and the sub-stabilizing device 60 having the fuel cell 61 are operated as power buffers by autonomously performing charge operation or discharge operation in accordance with the relationship in magnitude between the corresponding charge-&-discharge threshold value and the bus voltage. As a result, it was found that the bus voltage detection value was maintained in a predetermined permissible range (in a range of approximately from 379.7 [V] to 380.5 [V]). When the supply power of the direct current bus 70 is considered, as described above, the bus voltage detection value closely followed the bus voltage target value, and was maintained substantially constantly within the predetermined permissible range. As a result, the power fluctuation of the direct current bus 70 substantially matches the change in the current value. Therefore, in the direct current bus control system according to the present invention, with the control of voltage performed by the main stabilizing device 30 and the control of the current performed by the sub-stabilizing devices 50 and 60, the power fluctuation of the direct current bus 70 can be controlled.

In a case where multiple sub-stabilizing devices having charge functions (for example, sub-stabilizing devices having water electrolysis cells) are connected to the direct current bus 70, a quickly responding sub-stabilizing device operates preferentially to absorb the power fluctuation of the direct current bus 70, and the remaining sub-stabilizing devices may not operate. Such a situation is not desirable from the viewpoint of equalizing the operations of the devices. A problem similar to the above may occur in a case where multiple sub-stabilizing devices having discharge functions (for example, sub-stabilizing devices having fuel cells) are connected to the direct current bus 70 or in a case where multiple sub-stabilizing devices having charge-&-discharge functions (for example, sub-stabilizing devices having power storage devices) are connected to the direct current bus 70.

For the above problem, a Droop control for reducing the output voltage according to the increase of the output current may be applied to multiple sub-stabilizing devices having the same function (a charge function or a discharge function) to adjust the Droop rates so that the load (e.g., a utilization ratio or operation responsibility) may be distributed to the devices with a predetermined ratio.

Instead of the operation method for equalizing the operations of multiple sub-stabilizing devices as described above, in view of a reaction responsiveness, a charge capacity, and the like of each sub-stabilizing device, it may be considered to employ a method of operating with prioritization of charge powers and discharge powers, such as, for example, causing a certain sub-stabilizing device to operate in a state close to a fully charged state and causing another sub-stabilizing device to operate in a substantially completely discharged state.

This application claims priority based on Japanese Patent Application No. 2017-223808 filed with the Japan Patent Office on Nov. 21, 2017, the entire content of which is incorporated herein by reference.

What is claimed is:
1. A direct current bus control system for controlling a power fluctuation of a direct current bus connecting between an input power supply and a load, the direct current bus control system comprising:
a main stabilizing device including a first charge-&-discharge element and a first power converter; and at least one sub-stabilizing device including a second charge-&-discharge element, a charge element, or a discharge element, and including a second power converter, wherein the first power converter is configured to derive a bus voltage target value according to a power storage amount index of the first charge-&-discharge element, and to bidirectionally pass direct current power between the first charge-&-discharge element and the direct current bus, so that the voltage of the direct current bus matches the bus voltage target value, and the second power converter is configured to derive a current target value according to a difference between: a threshold value of charge or discharge of the second charge-&-discharge element, the charge element, or the discharge element; and the voltage of the direct current bus, and is configured to pass direct current power between: the second charge-&-discharge element, the charge element, or the discharge element; and the direct current bus, so that a current equal to the current target value flows to or from the second charge-&-discharge element, the charge element, or the discharge element.

2. The direct current bus control system according to claim 1, wherein the at least one sub-stabilizing device comprises a plurality of sub-stabilizing devices, and the plurality of sub-stabilizing devices includes at least one of a sub-stabilizing device having the charge element and a sub-stabilizing device having the discharge element.

3. The direct current bus control system according to claim 1, wherein the first power converter is configured to determine the bus voltage target value within a predetermined permissible range of the voltage of the direct current bus.

4. The direct current bus control system according to claim 1, wherein the first power converter includes a first DC-DC converter, and is configured to control the first DC-DC converter based on a result obtained by comparing the voltage of the direct current bus with a charge-&-discharge threshold value of the first charge-&-discharge element connected to the first power converter.

5. The direct current bus control system according to claim 4, further comprising a monitoring-&-instruction device capable of sending and receiving an operation instruction and state information about the main stabilizing device and the sub-stabilizing device, wherein the monitoring-&-instruction device is configured to transmit the charge-&-discharge threshold value to the first power converter.

6. The direct current bus control system according to claim 1, wherein the second power converter includes a second DC-DC converter, and is configured to control the second DC-DC converter based on a result obtained by comparing a charge threshold value of the second charge-&-discharge element or the charge element or a discharge threshold value of the second charge-&-discharge element or the discharge element with the voltage of the direct current bus.

7. The direct current bus control system according to claim 6, further comprising a monitoring-&-instruction device capable of sending and receiving an operation instruction and state information about the main stabilizing device and the sub-stabilizing device, wherein the monitoring-&-instruction device is configured to transmit the charge threshold value or the discharge threshold value to the second power converter.

8. The direct current bus control system according to claim 1, wherein as the power storage amount index increases, the bus voltage target value increases accordingly.

9. The direct current bus control system according to claim 1, wherein the power storage amount index is a state of charge of the first charge-&-discharge element.

10. The direct current bus control system according to claim 1, wherein as a difference between the threshold value and the voltage of the direct current bus increases, the second power converter increases a charge-&-discharge current of the second charge-&-discharge element, the charge element, or the discharge element, accordingly.

11. The direct current bus control system according to claim 1, further comprising a renewable energy power supply system as the input power supply.

12. The direct current bus control system according to claim 11, further comprising the load.

* * * * *